3,219,596
WATER INSOLUBLE ITACONIC ACID INTER-
POLYMERS AND PROCESS FOR SEPARATING
CATIONS IN SOLUTION
Ezekiel H. Hull and James M. Leach, Greensboro, N.C., and Bryce E. Tate, Niantic, Conn., assignors to Chas. Pfizer & Co. Inc., New York, N.Y., a corporation of Delaware
No Drawing. Filed Jan. 16, 1962, Ser. No. 166,718
2 Claims. (Cl. 260—2.2)

This application is a continuation-in-part of application Serial No. 18,495, filed March 30, 1960, now abandoned.

This invention is concerned with new and valuable polycarboxylic acid resins and more particularly with water-insoluble itaconic acid interpolymers and methods for their preparation. It is also concerned with novel separation processes which utilize these resins.

The new resins are interpolymers of itaconic acid and a polyunsaturated comonomer. They may in addition contain one or more other monounsaturated comonomers in interpolymerized form. These novel resins have a number of valuable properties, particularly in the field of ion exchange, where they are surprisingly effective in removing polyvalent cations from solution.

It has been found that conventional methods are generally unsatisfactory for the synthesis of these products, and a unique process has now been discovered for their preparation. According to the new procedure, which is described in greater detail hereinafter, the itaconic acid is introduced into the polymerization mixture in the form of one of its β-monoalkyl esters, and the alkyl group is subsequently removed from the polymer by hydrolysis.

A variety of polyunsaturated comonomers may be employed in the preparation of the products of the present invention, provided that the substance selected contains at least two polymerizable double bonds per molecule. Examples of such substance include divinylbenzene, monoallyl maleate, monoallyl itaconate, diallyl succinate, methyl allyl maleate, ethyl allyl itaconate, triallyl citrate, diallyl maleate, methallyl acrylate and ethylene glycol dimethacrylate. Particularly preferred for this purpose are diallyl itaconate and allyl methacrylate. In addition, of course, a mixture of two or more polyunsaturated monomers may be employed. Their total concentration may vary over a wide range, but ordinarily at least about 2% by weight, based on the total monomer mixture, will be employed to insure dimensional stability of the resulting polymer in water. (Lower concentrations of polyunsaturated monomer, between about 0.1 and 2%, are adequate to provide water-insolubility, but the resulting polymers tend to swell substantially in water, a property which makes them undesirable for use in packed columns.) It will ordinarily be unnecessary to include more than about 20% of polyunsaturated monomer.

As stated, the itaconate will be introduced in the form of a β-monoalkyl ester, that is, an itaconic acid wherein the β-carboxyl group is esterified. A wide range of alkyl groups, both straight-chain and branched, are suitable, but those of up to about nine carbon atoms are preferable, and the β-monobutyl ester is particularly preferred. Esters derived from alcohols of even more than nine carbon atoms may also be employed, but these are somewhat less desirable, since their use entails substantial weight loss as alcohol upon hydrolysis, with consequent reduction in production capacity. The β-monoalkyl itaconates are readily prepared by a variety of well known methods, such as by heating the free acid or its anhydride with about one molar proportion of an alkanol. Conventional modes of product purification, such as distillation or recrystallization, may be employed.

In addition to the aforementioned components, another monounsaturated monomer may be incorporated if desired. Among those suitable, for example, are such monomers as methyl methacrylate, ethyl acrylate, vinylidene chloride, acrylonitrile, maleic anhydride, or the like. Particularly suitable are styrene or a vinyl toluene. In addition, of course, mixtures of two or more of such monomers may be employed. Best results are obtained by employing a total concentration of such components of from 0 to about 30% by weight of the total monomer mixture.

A free-radical polymerization catalyst is ordinarily required, and one which is soluble in the combined monomers is desirable. Such catalysts, for example, as benzoyl peroxide, lauroyl peroxide, t-butyl perbenzoate, di-t-butyl peroxide, or mixtures of two or more of these, may be employed. Many others will readily occur to those skilled in the art. The most suitable catalyst concentration will, of course, vary with the particular catalyst, the monomer system and the polymerization temperature selected. Catalyst concentrations ranging from about 0.2 to about 2% by weight, based on the total monomer, are usually adequate.

Various modes of polymerization are practical, but mass (bulk) polymerization or suspension (bead) polymerization are particularly appropriate, and of these, suspension polymerization is preferred.

The suspension medium selected should be stable, substantially immiscible with the monomer mixture, and fluid at the polymerization temperature. Water is an excellent medium and will almost always be preferred. The relative proportion of water to monomer is not critical, but from the standpoint of production capacity it is, of course, desirable that this proportion be kept relatively low. From about one to about three parts of water per part of monomer are often employed.

A suspending agent is generally desirable for successful bead polymerization, and a wide variety, well known to those skilled in the art, are available and effective. Among these are talc, starch, gelatin, pectin, alginates, methyl cellulose, hydroxyethyl cellulose, carboxymethyl cellulose, gum acacia and gum tragacanth. Particularly preferred is polyvinyl alcohol. The best concentration of suspending agent will vary somewhat with the other conditions, but it is frequently found that from about 50 to about 10,000 p.p.m., based on monomer plus water, is adequate.

For the polymerization the monomer, containing the catalyst in solution, is combined with the water and the suspending agent in a vessel from which the air is preferably displaced by an inert gas such as nitrogen. Agitation is provided to disperse the monomer phase into droplets and to maintain the monomer in this dispersed form until polymerization is complete. Elevated temperature is usually necessary to complete the polymerization in reasonable time and, while a wide range of temperatures may be employed, those ranging from about 50° C. to about 95° C. are usually preferred. Temperatures materially below 50° C. may require excessively prolonged reaction time, while temperatures above 100° C. will require pressure equipment where water is the continuous phase.

Heating and agitation are continued until the polymerization is substantially complete and the monomer droplets are converted to hard beds. While the required time will vary somewhat, depending on the temperature, catalyst and catalyst concentration, periods of from about 2 to about 24 hours are usually adequate.

The resulting β-monoalkyl itaconate copolymer may be hydrolyzed without separation from the aqueous suspension medium. It is merely necessary to add a strong acid, such as hydrochloric or sulfuric acid, or a base, such as sodium or potassium hydroxide, and boil until hydrolysis is complete. The reaction is expedited by distilling off the lower alkanol formed. If the polymer was prepared by mass polymerization it is subdivided to granular state by grinding, and hydrolyzed by similar treatment with aqueous acid or base. For most rapid reaction the acid or base should be relatively concentrated, for example, 5 or 6 Normal.

The progress of the reaction is conveniently followed by collecting and measuring the lower alkanol as it distills. The β-monoalkyl itaconate copolymers of the present invention hydrolyze rapidly and completely under the described conditions to the corresponding itaconic acid copolymers. As little as 4 hours' reflux, or even less, is frequently adequate. By way of contrast, attempts to prepare these products by boiling dialkyl itaconate copolymers with strong aqueous acid or base have been unsuccessful, hydrolysis being far from complete even after prolonged periods of reflux, as high as 36 hours, for example. As a result, the products are seriously deficient in such properties as ion-exchange capacity.

After hydrolysis is found to be complete, the rigid itaconic acid copolymer granules may be separated from the reaction medium by filtration or decanting and washed with water to remove residual acid or base and suspending agent. If alkaline hydrolysis has been employed, the polyitaconate will be in the form of a salt corresponding to the base used. It may be recovered in this form if desired, or washed with aqueous acid to convert it to the free carboxylic acid.

The described process is uniquely effective for the preparation of the new itaconic acid resins. If dialkyl itaconates are employed, attempts to completely hydrolyze the resulting copolymers are unsuccessful, even after prolonged reflux with acid or base. The evidence indicates that hydrolysis of these poly(dialkyl itaconates) to the poly(α-monoalkyl esters) proceeds at reasonable rate, but the further hydrolysis of these esters is virtually impossible to achieve completely by known methods. Thus, the highest base capacity the present investigators have been able to achieve by hydrolysis of cross-linked poly(dimethyl itaconate) (refluxed 24 hours with 8 N NaOH in alcohol) is only 7.5 meq./gm. of dry resin, compared with values of over 14 meq./gm. by the novel process of the present invention. Clearly, in the itaconate series, hydrolysis of poly(diester) or the poly(monoester) resulting therefrom does not give a satisfactory ion-exchange resin. On the other hand, itaconic acid itself is found to be entirely unsuitable for the preparation of copolymers of high itaconate content.

The new itaconic acid copolymers are excellent ion-exchange resins of particularly high capacity in either their free acid or salt forms. They have been found to be uniquely suitable for the separation of cations in solution. For example, in accordance with a further embodiment of the invention, solutions containing cobalt and nickel ions are readily separated by contact with these resins. The mixed solution is suitably passed by gravity through a bed of the resin, whereupon the cobalt cations are adsorbed upon the resin and the cobalt-free nickel effluent is collected. Subsequently, the adsorbed ionic cobalt is eluted from the resin, by replacement with hydrogen ions or other cations, and the nickel-free cobalt effluent is collected. Of course, such processes may be conducted batchwise in an agitated vessel, or by other conventional techniques, as well as by tower operation. Such separations are extremely valuable for the recovery and separation of alloy by-products, as well as in analytical chemistry. Conventional cation-exchange resins, such as cross-linked acrylic acid resins, are not found to have this highly selective property. The ready separation of cobalt and nickel by the new resins is especially surprising in view of the fact that they are found to have high capacity for nickel ions in the absence of cobalt, but reject the nickel in the presence of cobalt ions. These resins are particularly valuable in removing polyvalent cations from solution, and are highly selective for alkaline earth cations, such as calcium and barium, and heavy metals, such as copper and iron. Not only is capacity for these ions extremely high, but large volumes of solutions containing such ions can be passed over the new resins before "leakage" or "breakthrough" is observed. Capacity for polyvalent cations is especially good where at least part of the resin carboxyl groups are in the salt form, for example, in the form of a sodium or potassium salt. Relative to conventional methacrylic acid resins, the new resins of the present invention exhibit nickel, copper, calcium and magnesium capacity far beyond what would be predicted from the relative equivalent weights. For example, where the theoretical maximum capacity of a given itaconic resin is 33% higher than a typical methacrylic resin, its calcium and magnesium capacity is 50-65% higher, and its nickel and copper capacities are 100% higher. The explanation for this remarkable behavior is unknown.

In nickel studies, if a nickelous ammonium sulfate solution, $NiSO_4(NH_4)_2SO_4$, containing 1% nickel is passed through test resins, results as follows are obtained:

| Resin | $Ve/Vb$ before Ni break-through | M moles Ni/g. $NH_4$ resin before Ni break-through |
|---|---|---|
| IA/20% DAI | 4.4 | 2.73 |
| MAA/5% DVB | 1.7 | 1.34 |

IA=itaconic acid.
DAI=diallyl itaconate.
MAA=methacrylic acid.
DVB=divinylbenzene.
$Ve$=volume effluent.
$Vb$=volume resin bed.

Calcium and magnesium removal from sea water is also excellent, as measured by equilibration of resins with a 200% excess of a 0.10% $CaCl_2$/0.10% $MgCl_2$/8.0% NaCl solution, with results as follows:

| Resin | Calcium/Magnesium Pick-up | |
|---|---|---|
| | m. moles/g. dry Na resin | m. moles/ml. wet resin |
| IA/20% DAI | 2.6 | 0.83 |
| IA/15% DAI | 2.5 | 0.73 |
| IA/10% DAI | 2.8 | 0.39 |
| IA/5% DAI | 2.8 | 0.27 |
| MAA/5% DVB | 1.7 | 0.12 |

In column studies, itaconic acid resins cross-linked with 20% diallyl itaconate, ethylene glycol dimethacrylate or 20% allyl methacrylate remove over 99% of the hardness (1950 p.p.m. as $CaCO_3$) for 50, 30 and 20 resin bed volumes respectively, vs. 15 bed volumes for a commercial methacrylic acid polymer cross-linked with 5% divinylbenzene.

The new resins have a variety of other uses as well, where their high capacity and selectivity are advantageous. They may, for example, be utilized in antibiotic and vitamin recovery and purification, in sugar refining, and as carriers for drugs in topical and oral applications, in low sodium therapy, and as tablet disintegrants.

The following examples are provided by way of illustration and should not be interpreted as limiting the invention many variations of which are possible without departing from the spirit or scope thereof.

*Example I*

| | | |
|---|---|---|
| Polyvinyl alcohol [1] | gm | 2.43 |
| Water | ml | 486 |
| β-Monobutyl itaconate | gm | 450 |
| Diallyl itaconate | gm | 36 |
| Benzoyl peroxide | gm | 6.18 |

[1] Elvanol 50–42, an 86–89% hydrolyzed polyvinyl acetate having a viscosity of 35–45 cp. in 4% water solution at 20° C.; available from the Du Pont Co.

The polyvinyl alcohol is dissolved in the water and the solution transferred to a 2 liter flask equipped with paddle stirrer and reflux condenser. The remaining ingredients are then combined to form a clear solution and added to the aqueous system. Agitation is adjusted to disperse the organic phase in the form of small droplets and the mixture is maintained at 65–95° C. with continuous agitation for 23 hours to insure complete polymerization.

Hydrolysis is then effected by adding 486 ml. conc. hydrochloric acid and distilling slowly over a 5 hour period to remove the butanol formed.

The remaining bead polymer of itaconic acid cross-linked with approximately 10% diallyl itaconate is separated by filtration, washed several times with water to remove hydrochloric acid and polyvinyl alcohol, and air-dried. A 98.5% yield of fine, hard beadlets is obtained, as calculated by completely drying a small sample with acetone and vacuum. The product is found to have a cation-exchange capacity of 11.2 meq. per gm., as determined by equilibrating overnight with a 100% excess of 0.1 N KOH in 1.0 N KCl.

An equilibrium titration curve for the resin is constructed by equilibrating less than 2.0 meq. portions of the resin with KOH for 16 days according to the schedule given below, and plotting equilibrium pH vs. meq. KOH employed per gram of resin.

| Sample No. | Ml. 1.0 N KCl | Ml. 0.1 N KOH in 1.0 N KCl |
|---|---|---|
| 1 | 25 | 0 |
| 2 | 23 | 2 |
| 3 | 21 | 4 |
| 4 | 19 | 6 |
| 5 | 17 | 8 |
| 6 | 15 | 10 |
| 7 | 13 | 12 |
| 8 | 11 | 14 |
| 9 | 9 | 16 |
| 10 | 7 | 18 |
| 11 | 5 | 20 |
| 12 | 0 | 25 |

Taking the mid-point of the last inflection (pH approximately 10.5) the maximum exchange capacity is determined to be 13.3 meq. per gram.

*Example II*

The procedure of Example I is repeated with the substitution of 36.0 gms. allyl methacrylate for the diallyl itaconate. The final product is obtained in 97% yield in the form of fine, hard beadlets which are found to have a cation-exchange capacity of 10.6 meq. per gm., as determined by equilibrating overnight, and 14.4 meq. per gm., as determined from an equilibrium titration curve according to the procedure of Example I.

*Example III*

The products of Examples I and II are tested for $Cu^{++}$ capacity in the presence and absence of sodium chloride. The resins are first converted to the sodium form and portions of each are then stirred 1 hour with an excess of $Cu(NH_3)_4^{++}Cl_2^{--}$ (250 p.p.m. $Cu^{++}$) in 2.5 N $NH_4OH$ to determine $Cu^{++}$ capacity. For removal of $Cu^{++}$ from aqueous NaCl solutions, the same procedure is followed except that salt is added to give a 3% NaCl concentration. Concentration of $Cu^{++}$ before and after contact is determined colorimetrically. For comparison, a bead copolymer of methacrylic acid with 5% divinylbenzene in the sodium cycle is subjected to the same tests. Results are as follows:

| Resin | $Cu^{++}$ capacity, meq./gm. | $Cu^{++}$ capacity from NaCl solution, meq./gm. |
|---|---|---|
| Example I | 8.7 | 2.5 |
| Example II | 8.2 | 2.3 |
| Methacrylic acid copolymer | 4.05 | 0.67 |

It is noted that the copper capacities of the itaconic acid ion-exchange resins relative to the methacrylic acid resin are substantially higher than would be predictable from relative equivalent weights.

*Example IV*

| | | |
|---|---|---|
| Polyvinyl alcohol (Elvanol 50–42) | gm | 2.5 |
| Water | ml | 500 |
| β-Monobutyl itaconate | gm | 360 |
| Styrene | gm | 120 |
| Divinylbenzene | gm | 40 |
| Benzoyl peroxide | gm | 7.86 |

The polyvinyl alcohol is dissolved in the water in a 3 liter flask and the remaining ingredients are combined to form a clear solution and added. Agitation is adjusted to disperse the organic phase in the aqueous phase in the form of small droplets, and polymerization is effected by heating at 65–95° C. for four hours with continuous stirring.

The reaction mixture is cooled to room temperature and a solution of 390 gms. potassium hydroxide in 670 ml. water is added. The mixture is heated to effect hydrolysis and the butanol formed is distilled.

When butanol corresponding to complete hydrolysis of the itaconate has been driven off, the polymer beads are separated from the aqueous solution by decanting and washed several times with water and with 5% aqueous hydrochloric acid to convert the resin to the free acid form. A 95% yield of fine, harl beads is obtained. They are found to have a $pK_1$ of about 6.4 and a $pK_2$ of about 8.8. Cation-exchange capacity is 6.3 meq. per gm., as determined by equilibrating overnight, and 9.3 meq. per gm., as determined from an equilibrium titration curve according to the procedure of Example I.

A mixture of β-monobutyl itaconate together with 8.44% allyl methacrylate is polymerized in suspension by the procedure of Example I and hydrolyzed with aqueous sodium hydroxide by the procedure utilized in Example IV. The resulting resin has an itaconic acid: allyl methacrylate mol ratio of 88:12 and a cation exchange capacity of 12.2 meq. per gram of dry resin in the hydrogen cycle. 90% of the beads are in the range 20–50 mesh. The resin is converted to the ammonium cycle by treatment with excess ammonium hydroxide.

*Example VI*

The resin produced in the preceding example is packed into a ⅜″ I.D. tube to a height of 12 inches (29.8 ml. packed volume).

An aqueous solution is prepared, containing nickel sulfate (equivalent to 2.35 gm. Ni$^{++}$ per liter), cobalt sulfate (equivalent to 2.08 gm. C$^{++}$ per liter) and ammonium chloride (50 gm. per liter), and this solution is adjusted to pH 9.0 with ammonium hydroxide. (The ammonium chloride is employed to maintain nickel and cobalt in solution at alkaline pH. Ammonium sulfate would also be suitable). This solution is permitted to flow through the resin bed by gravity at a rate of 0.10 ml. per minute per ml. of resin bed volume. Effluent fractions are recovered and analyzed, with results as given in the table below.

| Fraction No. | Volume, ml. | Nickel | | Cobalt | |
|---|---|---|---|---|---|
| | | gm./l. | gm. | gm./l. | gm. |
| 1 | 29.8 | 0.00 | 0 | 0.00 | 0 |
| 2 | 29.8 | 0.68 | 0.0202 | 0.00 | 0 |
| 3 | 29.8 | 2.36 | 0.0704 | 0.00 | 0 |
| 4 | 29.8 | 2.87 | 0.0855 | 0.00 | 0 |
| 5 | 29.8 | 2.64 | 0.0785 | 0.00 | 0 |
| 6 | 29.8 | | | Trace | |

Fractions 1–5 contain cobalt-free nickel and are combined and held separate. At this point four additional bed volumes of the cobalt-nickel solution are passed through the tower to saturate the resin with cobalt, and followed by a water rinse. The effluent fractions now contain a mixture of cobalt and nickel. They are combined and held separate.

Elution of the resin is now conducted by passing 2 N sulfuric acid over the tower. The fractions are collected and analyzed, with results as follows:

| Fraction No. | Volume, ml. | Nickel | | Cobalt | |
|---|---|---|---|---|---|
| | | gm./l. | gm. | gm./l. | gm. |
| 13 | 29.8 | 0.22 | 0.0066 | 0.72 | 0.0215 |
| 14 | 29.8 | 0.00 | 0 | 12.50 | 0.3730 |
| 15 | 29.8 | 0.00 | 0 | 1.16 | 0.0346 |
| 16 | 29.8 | 0.00 | 0 | 0.02 | 0.0006 |
| 17 | 29.8 | 0.00 | 0 | 0.00 | 0 |

Fractions 14–16 contain substantially pure cobalt sulfate. Cobalt capacity is calculated to be 2.64 meq. per gm. dry resin (0.855 lb. per cubic ft. of resin).

The capacity of the itaconic acid ion-exchange resin is rechecked after this cycle and is found to be 11.1 meq. per gm. dry resin in the hydrogen cycle.

Fractions 1–5 contain cobalt-free nickel, together with ammonium hydroxide and ammonium chloride. They are converted to pure nickel sulfate by adsorption on any one of the itaconic acid ion-exchange resins of the present invention, followed by elution with dilute sulfuric acid.

Combined intermediate fractions 7–13 are separated into pure cobalt and nickel salts by recycle to a second run.

When an attempt is made to repeat this experiment with a bead copolymer of methacrylic acid and 5% divinylbenzene having a capacity of 11.0 meq. per gm. of dry resin, no separation of cobalt and nickel is achieved.

*Example VII*

| | |
|---|---|
| Polyvinyl alcohol (Elvanol 50–42) gm | 0.40 |
| Water ml | 81 |
| β-Monobutyl itaconate gm | 75 |
| Diallyl itaconate gm | 3 |
| Benzoyl peroxide gm | 1.03 |

Suspension polymerization is effected as before, except that heating is conducted at 75–80° C. for 5½ hours. 81 ml. of conc. hydrochloric acid is then added and the flask is equipped for distillation and with a dropping funnel to admit water. The mixture is heated to effect hydrolysis, butanol being distilled as formed and co-distilled water being replaced from the funnel. The theoretical quantity of butanol is collected in 4 hours.

The resulting resin is separated, washed with water, and dried to provide a rigid, high-capacity cation-exchange resin.

*Example VIII*

The procedure of Example VII is repeated, with the substitution of 1.6 grams of diallyl itaconate or 1.6 grams of allyl methylacrylate for the diallyl itaconate of the previous example.

The hydrolyzed copolymers are hard beadlets having excellent dimensional stability in water at all pH values, and high cation-exchange capacity.

*Example IX*

| | Gm. |
|---|---|
| β-Monomethyl itaconate | 144 |
| Divinylbenzene | 54 |
| Vinyl toluene | 72 |
| Lauroyl peroxide | 2.7 |

The above ingredients are combined and polymerized by heating at elevated temperature. The resulting polymer is ground to fine particle size and hydrolyzed by boiling with 6 N aqueous sodium hydroxide. After washing and drying, the resulting rigid resin in its sodium form is found to have high capacity for polyvalent cations. It can be converted to the free polycarboxylic acid by treatment with dilute hydrochloric acid.

*Example X*

| | Gm. |
|---|---|
| β-Mono-(2-methylpentyl)itaconate | 214 |
| Allyl methacrylate | 14.4 |
| Benzoyl peroxide | 3.5 |

The above ingredients are polymerized by heating in aqueous suspension with a trace of talc. The polymerized beadlets are then hydrolyzed with hydrochloric acid, as previously described, and washed and dried. The resulting rigid product is found to have high capacity for polyvalent cations.

*Example XI*

The procedure of Example VIII is repeated, substituting β-monononyl itaconate for the hexyl ester, with similar results.

What is claimed is:
1. A process for the preparation of water-insoluble polycarboxylic acid bead polymer which process comprises interpolymerizing monomer droplets in water suspension and under free-radical-initiator conditions, said droplets comprising β-monoalkyl ester of itaconic acid with from about 2 to 20% by weight of comonomer having at least two polymerizable double bonds and from 0 to about 30% of comonomer having one polymerizable double bond, continuing said interpolymerization until said monomer dropets are converted to hard beads, and subsequently heating said beads with a hydrolyzing agent selected from the group consisting of acids and bases until said interpolymerized β-monoalkyl ester is substantially completely hydrolyzed.

2. A process for the separation of cobalt and nickel cations in solution which comprises contacting said solution with a water-insoluble polycarboxylic acid resin in bead form selected from the group consisting of a hydrolyzed interpolymer of a β-monoalkyl ester of itaconic acid, from about 2 to about 20% by weight of a comonomer having at least two polymerizable double bonds, and from 0 to about 30% by weight of a comonomer having one polymerizable double bond; and salts of said interpolymers and continuing said contacting until said cobalt cations are adsorbed upon said resin, withdrawing the resulting cobalt-free nickel solution, and eluting said cobalt cations from said resin adsorbate.

(References on following page)

References Cited by the Examiner

UNITED STATES PATENTS

| | | | |
|---|---|---|---|
| 2,340,110 | 1/1944 | D'Alelio | 260—78.5 |
| 2,771,459 | 11/1956 | Banes et al. | 260—78.5 |
| 2,794,785 | 6/1957 | D'Alelio | 260—78.5 |
| 2,912,399 | 11/1959 | Bartl | 260—78.5 |
| 3,055,873 | 9/1962 | Hull et al. | 260—78.4 |

OTHER REFERENCES

Kunin: Ion Exchange Resins, pp. 201–204, p. 204 relied on, 2nd ed. (1958).

Sugihara et al.: Chemical Abstracts, 19222–3, vol. 53 (1959).

WILLIAM H. SHORT, *Primary Examiner.*

J. R. LIBERMAN, *Examiner.*